(12) United States Patent
Perry et al.

(10) Patent No.: US 9,176,912 B2
(45) Date of Patent: Nov. 3, 2015

(54) PROCESSOR TO MESSAGE-BASED NETWORK INTERFACE USING SPECULATIVE TECHNIQUES

(75) Inventors: Steven Perry, High Wycombe (GB); Gareth Duncan, Maidenhead (GB)

(73) Assignee: ALTERA CORPORATION, San Jose, CA (US)

( * ) Notice: Subject to any disclaimer, the term of this patent is extended or adjusted under 35 U.S.C. 154(b) by 50 days.

(21) Appl. No.: 13/369,727

(22) Filed: Feb. 9, 2012

(65) Prior Publication Data

US 2013/0061247 A1 Mar. 7, 2013

Related U.S. Application Data

(60) Provisional application No. 61/531,950, filed on Sep. 7, 2011.

(51) Int. Cl.
*G06F 13/38* (2006.01)
*H04L 12/861* (2013.01)

(52) U.S. Cl.
CPC .............. *G06F 13/385* (2013.01); *H04L 49/90* (2013.01); *G06F 2213/3808* (2013.01)

(58) Field of Classification Search
CPC ......... G06F 9/546; G06F 9/542; G06F 9/465; G06F 3/0481; H04L 67/12; H04L 63/329; H04L 12/5815; H04L 5/00; H04L 25/03955; H04W 24/02; H04W 36/0072; H04W 36/0083; H04W 36/06; H04W 72/0406; H04W 72/0426; H04W 72/044; H04W 40/02; G06Q 10/06; G06Q 10/10; G06Q 10/109

See application file for complete search history.

(56) References Cited

U.S. PATENT DOCUMENTS

| | | | | |
|---|---|---|---|---|
| 2004/0194097 | A1* | 9/2004 | Spencer | 718/100 |
| 2005/0132408 | A1* | 6/2005 | Dahley et al. | 725/80 |
| 2008/0082756 | A1* | 4/2008 | Shen | 711/141 |
| 2008/0285571 | A1* | 11/2008 | Arulambalam et al. | 370/400 |
| 2009/0150622 | A1* | 6/2009 | Allen et al. | 711/154 |
| 2010/0014421 | A1* | 1/2010 | Willenborg et al. | 370/229 |
| 2010/0191862 | A1* | 7/2010 | Forbes et al. | 709/240 |
| 2011/0007754 | A1 | 1/2011 | Pepper et al. | |
| 2011/0066538 | A1* | 3/2011 | Liberman et al. | 705/37 |
| 2011/0307689 | A1* | 12/2011 | Chung et al. | 712/234 |

FOREIGN PATENT DOCUMENTS

WO   WO 95/12946   5/1995

* cited by examiner

*Primary Examiner* — Tuan Dao
(74) *Attorney, Agent, or Firm* — Ropes & Gray LLP

(57) ABSTRACT

Methods and systems are provided for a message network interface unit (a message interface unit), coupled to a processor, that is used for allowing the processor to send messages to a hardware unit. Methods and systems are also provided for a message interface unit, coupled to a processor, that is used for allowing a processor to receive messages from a hardware unit. The message network interface unit described herein may allow for the implementation data-intensive, real time applications, which require a substantially low message response latency and a substantially high message throughput.

20 Claims, 6 Drawing Sheets

PROCESSOR TO MESSAGE-BASED NETWORK INTERFACE USING SPECULATIVE TECHNIQUES

CROSS REFERENCE TO RELATED APPLICATION

This application claims the benefit and priority to commonly-assigned U.S. Provisional Patent Application No. 61/531,950, filed Sep. 7, 2011, which is hereby incorporated by reference herein in its entirety.

FIELD OF THE INVENTION

This invention relates to integrated circuit devices, and particularly to a such devices having a message network interface unit for high speed message passing.

BACKGROUND OF THE DISCLOSURE

As data-intensive electronic devices and applications proliferate, data rates continue to increase. To facilitate the use of devices such as programmable logic devices in certain data-intensive, real time applications, hierarchical specialized processing blocks, including lower level specialized processing blocks and a message passing communication structure are increasingly being used. A specialized processing block, such as an intellectual property (IP) block, is a block circuitry, that may be separate from the general-purpose programmable logic of a device on which it is implemented, that is at least partially hardwired to perform a specific function. A specialized processing block (e.g., an IP block) that is at a lower hierarchical level, in terms of the device communications structure, than other specialized processing blocks or circuitry may be referred to as a lower level specialized processing block (e.g., a lower level IP block). Lower level specialized processing blocks are best coordinated using software operating on a processor, which communicates to these specialized processing blocks using a message network. For example, a processor may read and write messages using a memory mapped protocol and messages may be transmitted to or from the lower level specialized processing blocks using a streaming packet based protocol. A very efficient interface may be used between the processor and the message network for use in data-intensive, real time applications.

Message passing networks have come into common use. Many existing message passing networks allow processors or processing blocks (e.g., IP cores) to send and receive messages in order to communicate with each other. For example, network on a chip (NoC) designs have been created and used for communication between IP cores in a system on a chip (SoC). There are also multiple existing interface designs, for use between a processor and the message passing network, that are used by the processor to communicate with specialized processing blocks. As an example of such an interface design, PicaRISC, DPX makes use of a FIFO based message passing mechanism. As another example of an interface design, a processor embedded in a programmable device can send messages by writing the messages directly into the network during a bus write cycle. However, these interface designs have drawbacks. In particular, PicaRISC, DPX tends to be inflexible because of the FIFO requirement, and a design involving writing messages directly into the network tends to be inflexible because the messages need to be contiguously grouped.

SUMMARY OF THE DISCLOSURE

Due to the inflexibility of existing message passing networks, there is a need for a fast and efficient interface between a processor and the message passing network.

To address the above and other shortcomings within the art, the present disclosure presents methods and systems for providing a fast and efficient interface between a processor and a message passing network. This interface reduces the latency of sending messages from a processor (i.e., increases message throughput) and the latency of acting on messages received from hardware units (i.e., reduces message response latency).

The message interface reduces these latencies by speculatively creating messages in a scratchpad memory within transmit registers, speculatively queuing the created messages in one or more queues, and later making a decision as to whether or not to send any of the messages and/or queues of messages.

In particular, the interface reduces the number of processor clock cycles required to send a message because messages can be created during periods when the processor would otherwise be idle, and well ahead of when they are to be sent. The transmit registers and scratchpad memory may be used as a template to allow the processor to create boiler-plate messages and to customize them. An application programming interface (API) is provided to allow close to optimal consumption of processor clock cycles for message creation (i.e. creation of a message at a rate close to 1 message word per processor cycle). One or more queues are used to speculatively queue the created messages.

In addition, the interface described herein reduces the latency of receiving messages and acting on messages received by having one or more individually addressed queues to queue incoming messages. The queues may be associated with a priority level. The priority level may be used to determine in which order to process the messages among the messages in different queues. For example, a message from a queue with the highest priority level may be processed ahead of a message from a queue with a lower priority level. The message network interface described herein may allow for the implementation data-intensive, real time applications, which requires a substantially low message response latency and a substantially high message throughput.

Methods and systems are provided for a message network interface unit (i.e., a message interface unit), coupled to a processor, that is used for allowing the processor to send messages to a hardware unit. In an embodiment, the message interface unit includes transmit registers. The transmit registers, which include a scratchpad memory, store arguments of at least one of the messages, which are speculatively created by the processor. One or more queues are coupled to the transmit registers. The one or more queues may be used to queue the messages. An action may be taken on the one or more queues in response to receiving, at the message interface unit, a message indicating the action to be taken. The action that may be taken on one or more queues includes discarding all of the content in one of the queues in response to receiving a message that indicates that an exception occurred. The action that may be taken on one or more queues includes sending each of the messages stored in one of the queues. In some embodiments, the message interface unit and the processor are located on the same device. Examples of devices include a programmable logic device, an integrated circuit device, or other device. In some embodiments, the message interface unit is used by a video scalar.

Methods and systems are also provided for a message interface unit, coupled to a processor, and used for allowing the processor to receive messages from a hardware unit. In an embodiment, the message interface unit includes one or more queues that may be used to queue the messages. Each of the one or more queues may be assigned a unique address that indicates a priority level for that queue. The unique address is used as a destination address in messages sent by the hardware unit to either the processor or the message interface unit. Receive registers are coupled to the one or more queues. The receive registers are used to store arguments of one or more of the messages. In some embodiments, the receive registers are used to store the arguments of a message in a queue that currently has the highest priority level and this message is processed by the processor prior to messages in other queues, for example, in queues with a lower priority level. In some embodiments, the message interface unit and the processor are located on the same device, such as, for example, a programmable logic device.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which.

DETAILED DESCRIPTION OF THE INVENTION

To provide an overall understanding of the invention, certain illustrative embodiments will now be described. However, it will be understood by one of ordinary skill in the art that the systems and methods described herein may be adapted and modified as is appropriate for the application being addresses and that the systems and methods described herein may be employed in other suitable applications, and that such other additions and modifications will not depart from the scope hereof.

Figure 1:
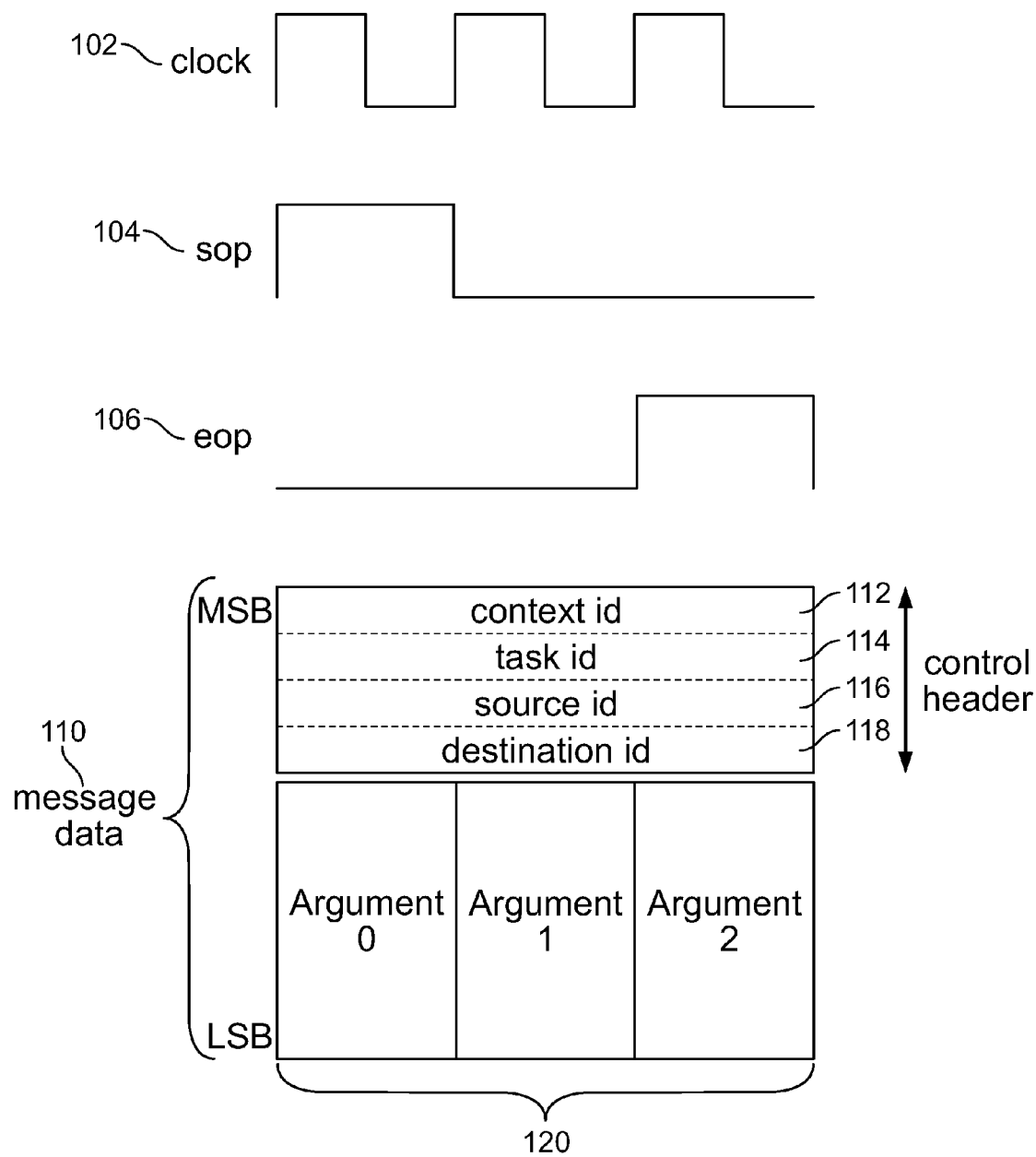
FIG. 1 is a simplified diagram of signals corresponding to a message and the format of a message, according to an illustrative embodiment.

FIG. 1 is a simplified diagram of signals corresponding to a message and the format of a message, according to an illustrative embodiment. As used herein, a message may be similar to a function call in software programming. In particular, a message may be a packet that encapsulates a function call. For example, a message may encapsulate and convey the information necessary to perform the function call void $f_{OO}$ (int argument 1, ..., int argument N). In this function call, the task to perform is $f_{OO}$ and the arguments that provide input to the task are argument 1 through argument N. In a packetized message format, the function $f_{OO}$ corresponds to a task identified by a Task ID and the arguments argument 1 through argument N each corresponds to an argument data word in the packet. When a hardware unit (e.g., a processor or a specialized processing block) receives this message, the message instructs the hardware unit to perform the task $f_{OO}$ (i.e. the task associated with the Task ID) using the associated inputs argument 1 through argument N (i.e., using the received argument data words in the packet).

FIG. 1 shows clock signal 102 that is used to determine periods during which messages can be sent or received. FIG. 1 also shows start of packet (sop) signal 104 and end of packet (eop) signal 106. The sop indicates the start of the packet, and the message, and eop indicates the end of the packet, and the message. FIG. 1 additionally shows the general format of a message 110. As illustrated in 110, the control header, which includes Context ID (CID) 112, Task ID (TID) 114, Source ID (SID) 116, and Destination ID (DID) 118, can be found among the most significant bits (MSBs) of the message. Each of argument data words 120 can be found among the least significant bits (LSBs) of the message in 110. Context ID 112 indicates the state in which the task related to message 110 is to be executed. Task ID 114 indicates the task to be performed. Source ID 116 identifies the sender of the message. Destination ID 118 identifies the receiver of the message and may allow the message to be routed to, for example, the correct receiver of the message or the correct queue.

Figure 2A:
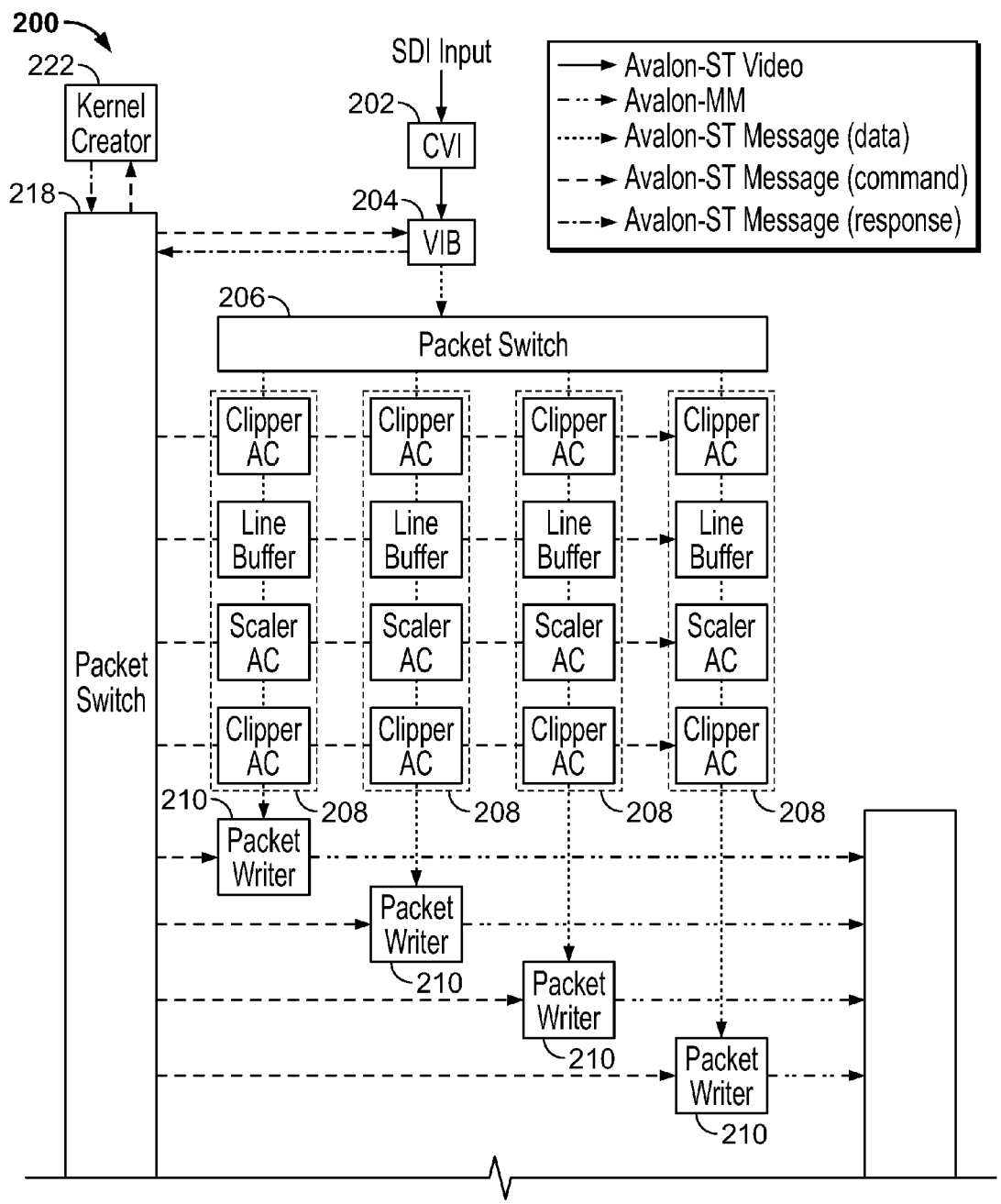
FIGS. 2A and 2B are a simplified block diagram for a video scalar that makes use of a message interface unit, according to an illustrative embodiment.
Figure 2B:
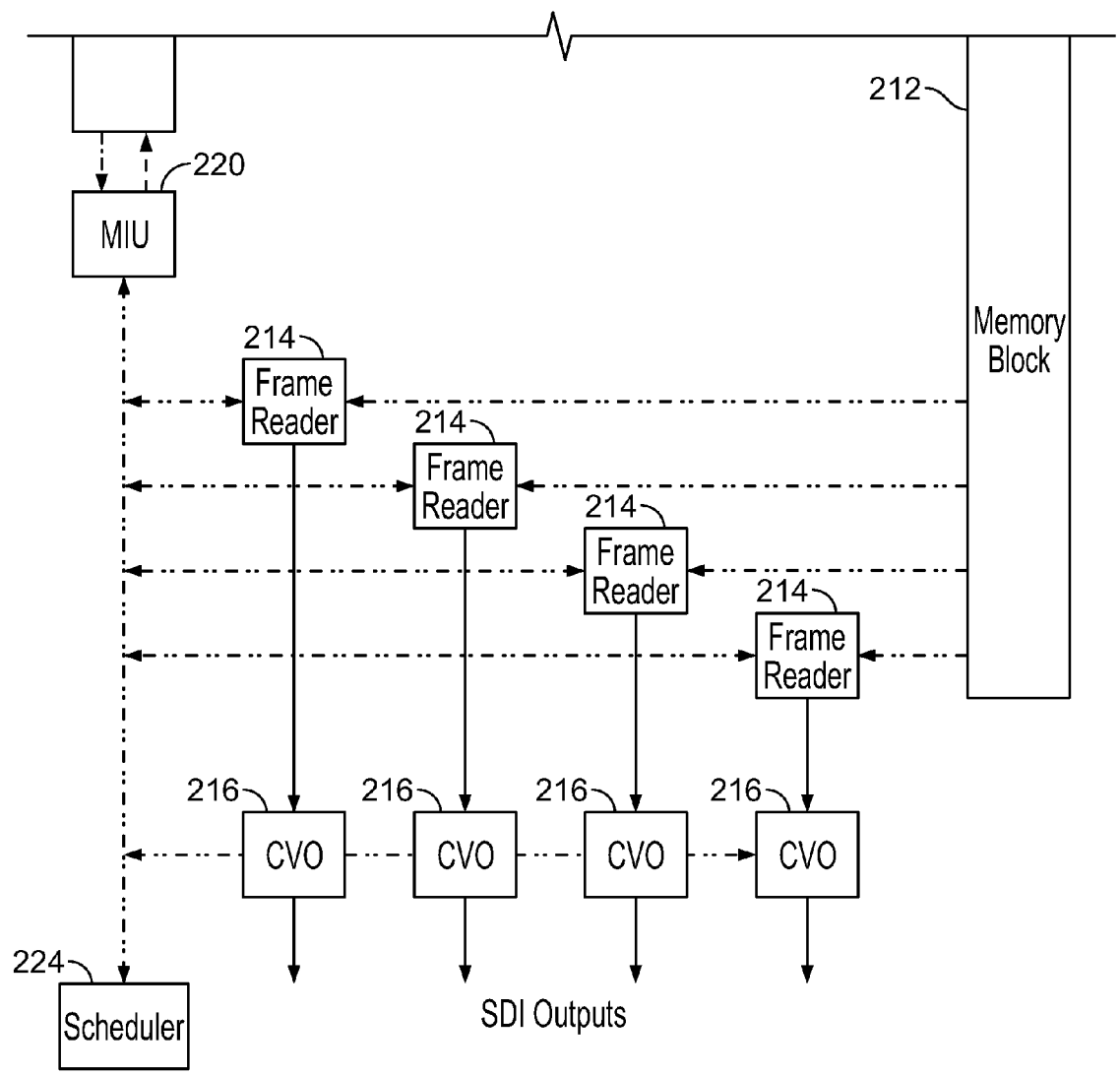

FIGS. 2A and 2B are a simplified block diagram of video scalar 200, which makes use of message interface unit 220, according to an illustrative embodiment. Video Scalar 200 includes clocked video input (CVI) unit 202, VIB unit 204, packet switch 206, hardware pipelines 208, packet writers 210, DDR3 memory block 212, frame readers 214, clocked video output (CVO) units 216, packet switch 218, message interface unit 220, kernel creator 222, and processor 224 (also referred to as scheduler 224). Video scalar 200 may be used for the video processing, such as, for example, upscaling 1080p60 video (containing 1080 active lines of video per frame and 60 frames per second) to 4K video (i.e., 4× the resolution of 1080p60 video). In some embodiments, a processor 224 may be located external to scalar 200. In some embodiments, processor 224 may be a NIOS® CPU embedded in an FPGA available from Altera Corporation, of San Jose, Calif. In some embodiments, the processor may be any type of general processor or processing core. Video upscaling is in one exemplary embodiment that makes use of the message interface units described herein, however other functionalities in, for example, video processing, data storage, or communications may similarly be implemented using these message interface units.

Video upscaling may be performed using four of the hardware pipelines 208 of system 200. Each of the hardware pipelines may include four hardware units (in order, a clipper, a line buffer, a scalar, and another clipper), and each of the pipelines may operate on one quarter of the incoming video. Software operating on processor 224 may control each of hardware pipelines 208 to process the incoming video by sending messages using message interface unit 220. In particular, processor 224 may instruct message interface unit 220 to send messages to one of more of the hardware units in hardware pipelines 208. The software operating on processor 224 may be able to dynamically adapt any of the hardware pipelines to any particular type of incoming video stream by changing the type of messages sent via message interface unit 220 to the hardware units in hardware pipelines 208. This way of dynamically adapting hardware pipelines 208 may allow the pipelines to support multiple configurations and types of input and output video formats without complex hardware control. For example, hardware pipelines 208 may be able to support the output of one 4K video stream, four 1080p60 video streams, or four 720p60 video streams.

In operation, 1080p60 video may be input, one line of a frame at a time, to CVI unit 202, which may process and send this information to VIB unit 204. VIB unit 204 may packetize and output this information to packet switch 218, which may output this information to message interface unit 220 and to kernel creator 222. Message interface unit 220 may notify processor 224 of the incoming line of the frame of video by sending processor 224 one or more messages. Processor 224 may also be notified of the incoming line of the frame of video.

Processor 224 may receive messages corresponding to the incoming lines and frames of video and may process each of these messages. In particular, for 1080p60 video, each of the 60 incoming frames per second may, in effect, cause processor 224 to receive one message indicating the width and height of the frame. Each input active line of video of the incoming 1080 active lines may, in effect, cause processor 224 to receive two messages: one message indicating the start of the line and, another message indicating the end of line. Each input active line of video may also, in effect, cause processor 224 to receive two additional messages, from kernel creator 222 via packet switch 218, that contain the required coefficients calculated by the kernel creator for upscaling the input active line of video in order to generate two lines of output video. Each of the preceding messages may be received by processor 224 via message interface unit 220 communicating to the processor.

Using message interface unit 220, processor 224 may also send messages based on the frames and lines of incoming video to be upscaled. Each input frame may cause processor 224 to send six messages: two messages to kernel creator 222, and four messages to each of the line buffers in hardware pipelines 208. In addition, each input active line of video may cause processor 224 to send 52 messages, for example, to various components in each of the four hardware pipelines 208 via packet switch 218. Message interface unit 220 may send each of these messages on behalf of processor 224.

VIB unit 204 may receive messages sent by message interface unit 220 and/or kernel creator 222 via packet switch 218. VIB unit 204 may duplicate video data in these messages and forward the messages to packet switch 206, which may forward the messages to various components of hardware pipelines 208. Each of hardware pipelines 208, which operates on the active lines and frames of incoming video, contain a clipper that may clip a portion of each active line of video it receives, a line buffer to buffer multiple incoming clipped active lines of video, a scalar that scales the buffered and clipped active lines of video from the buffer, and a clipper to clip the scaled, buffered, and clipped video. As discussed above, each of these hardware units in hardware pipelines 208 may be controlled using control messages that are sent/forwarded by processor 224 and/or message interface unit 220. After being processed by hardware pipelines 208, the resulting video may be sent to packet writers 210 to be written to DDR3 memory block 212. The use of DDR3 memory block 212 is exemplary and not intended to limit the scope of the present invention. Other types of memory, for example, any type of random access memory, read-only memory, or flash memory may be used instead or in combination with DDR3 memory block 212. The resulting video can be read out of DDR3 memory block 212 at some later time by frame readers 214, which may each forward the video that it reads to one of the CVO units 216 to be output from scalar 200. Frame readers 214 may each be separately controlled using control messages that are sent/forwarded by processor 224 and/or by message interface unit 220.

In order to upscale 1080p60 video to be 4K video, a total of (60×1)+(1080×60×4)=259260 messages may be received by the processor every second and a total of (60×6)+(1080×60×52)=3369960 messages may be sent every second. Therefore, in this exemplary embodiment, a total of 259260+3369960=3.6 million messages may either be received or sent every second. Therefore, in this example, upscaling may require a throughput of 3.6 million messages per second.

Message response latency may be defined as the elapsed time between a processor receiving a message until the processor has completed taking appropriate action, which could, for example, include sending out the appropriate message(s) in response. The upscaling 1080p60 video to 4K video may require low message response latency. For real time applications, such as for example upscaling 1080p60 video to 4K video, message response latency may be a substantial factor in the overall latency in the completion of tasks. Thus, upscaling video may not only require a combined throughput of 3.6 million messages to be sent or received every second, but it may also require a substantially low message response latency.

Figure 3:
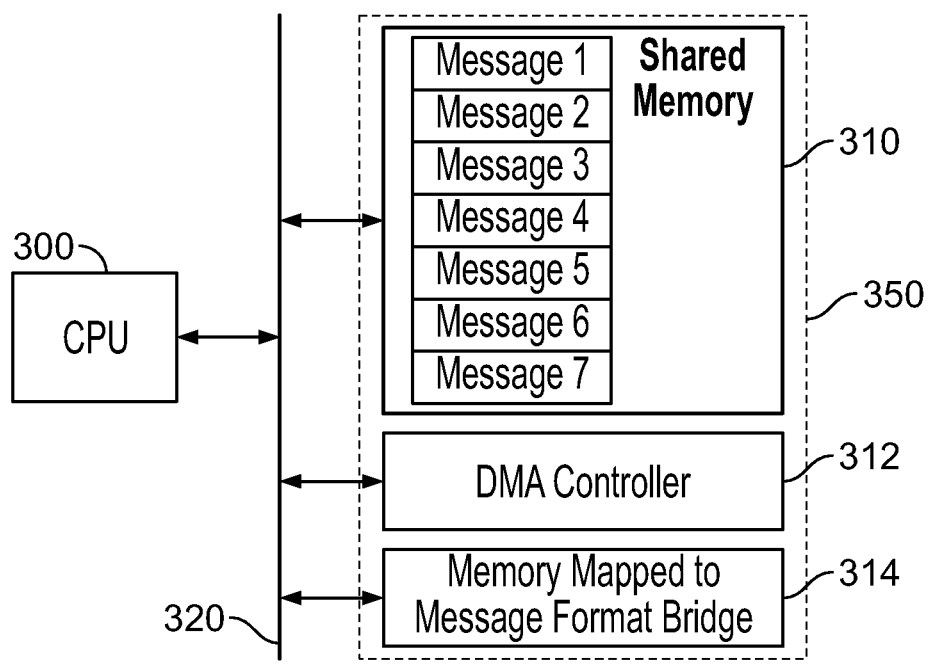
FIG. 3 is a Direct Memory Access solution for providing a message interface unit, according to an illustrative embodiment.

FIG. 3 is a Direct Memory Access based solution for providing a message interface unit, according to an illustrative embodiment. In FIG. 3, shared memory 310, Direct Memory Access (DMA) controller 312, and memory mapped to message format bridge 314 (collectively, message interface unit 350) are each coupled to processor 300 and to each other via databus 320. DMA controller 312 may be used by processor 300 to send and receive messages.

Processor 300 may create messages and store these messages in shared memory 310. For example, FIG. 3 shows seven messages that were created and stored by processor 300 in shared memory 310. Processor 300 may create a DMA transfer description, which refers to the messages in shared memory 310 that processor 300 wants to transmit. Processor 300 may then instruct the DMA controller 312 to send these messages by transferring the messages to one or more hardware units using memory mapped to message format bridge 314. Memory mapped to message format bridge 314 may packetize the messages and transfer the messages to the appropriate hardware unit(s). Although the message interface unit 350 solution shown in FIG. 3 is a fully functional message interface unit solution, it may not be able to meet the substantially high throughput requirements of certain data-intensive, real time applications. In particular, in the solution shown in FIG. 3, processor 300 may need to manage access to shared memory 310 to avoid overwriting messages that are being sent/transferred, leading to inefficient use of the processor. In addition, this solution may require processor 300 to create a DMA transfer description for DMA controller 312 for each message transfer, leading to inefficient use of the processor. Moreover, sending the same message multiple times or with minimal changes to the message using the solution shown in FIG. 3 may be inefficient for processor 300 because the solution requires processor synchronization with DMA controller 312. These inefficiencies for the processor may reduce message throughput when using the solution shown in FIG. 3.

The message interface unit 350 solution in FIG. 3 may also have too high of a message response latency for the proper operation of some data-intensive, real time applications when messages are received by the processor. In particular, in this solution, processor 300 is required to instruct DMA controller 312 to copy any incoming message to shared memory 310, leading to the inefficient use of clock cycles for processor 300. In addition, in this solution, DMA controller 312 interrupts processor 300 when the controller has finished copying any incoming message to shared memory 310. Processor 300 is then required to read the message and take appropriate action. The extra steps required for processor to take appropriate action for an incoming message lead to additional inefficiencies due to wasted clock cycles for processor 300. Thus, receiving a message using message interface unit 350 of the solution shown in FIG. 3 leads to processor inefficiencies, which may increase message response latency beyond the requirements for certain data-intensive, real time applications.

Figure 4:
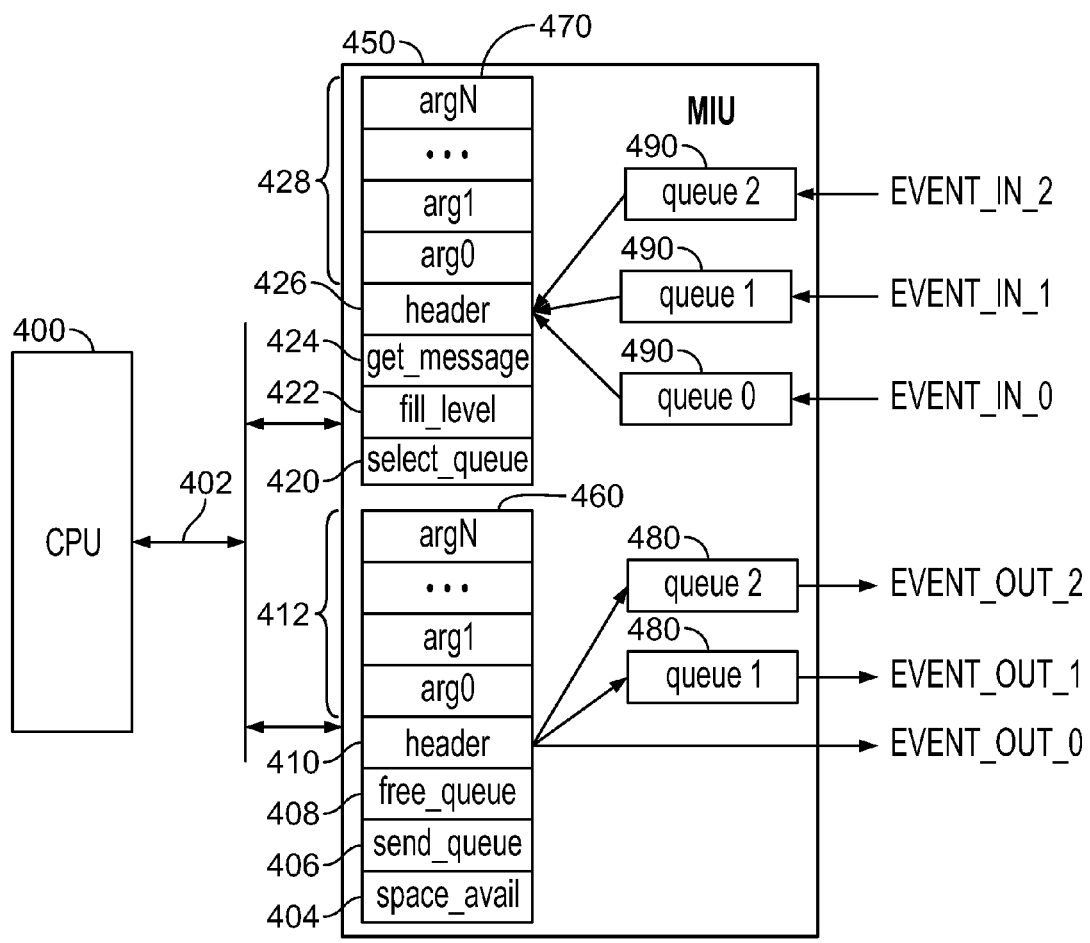
FIG. 4 is a simplified block diagram of a solution for providing a message interface unit, according to an illustrative embodiment.

FIG. 4 is a simplified block diagram of a solution for providing message interface unit 450, according to an illustrative embodiment. FIG. 4 shows processor 400, which is coupled to message interface unit 450 via databus 402. In some embodiments, processor 400 may be any type of general processor. In some embodiments, processor 400 is an embedded processor of a programmable integrated circuit device, such as a programmable logic device (e.g., an FPGA). For example, processor 400 may be a NIOS® CPU embedded in an FPGA available from Altera Corporation, of San Jose, Calif. In some embodiments, the processor may be any type of general processor or processing core. The processor may be located on the same device as message interface unit 450 or on a device that is separate or peripheral from message interface unit 450.

Message interface unit 450 may allow processor 400 to send and to receive messages. Message interface unit 450 may allow processor 400 to send and to receive messages at a sufficiently high throughput and sufficiently low message response latency to support data-intensive, real time applications, such as, for example, upscaling 1080p60 video to 4K video, described above. In some embodiments message interface unit 450 may be included on the same device as processor 400. In some embodiments, message interface unit 450 is a separate device (i.e., peripheral) from processor 400. In some embodiments, message interface unit 450 is a memory-mapped peripheral that can be attached to any processor. Message interface unit 450 may be similar to message interface unit 220 of FIG. 2B, and may be used with video scalar 200 of FIGS. 2A and 2B.

Message interface unit 450 may include transmit registers 460, which include several reserved registers (not shown), space_available register 404, send_queue register 406, free_queue register 408, header register 410, and argument registers 412. Argument registers 412 may also be referred to as a scratchpad memory. Processor 400 may read from or write to transmit registers 460 by communicating with message interface unit 450. In some embodiments, transmit registers 460 may be coupled to one or more queues 480, which may each be used to queue and send messages (e.g., messages created by the processor). In some embodiments, transmit registers 460 may be used to send messages without first queuing the messages. In one embodiment, the addresses of transmit registers 460 and the description with regards to what occurs when processor 400 either writes to or reads from each of these registers is shown in Table 1.

TABLE 1

| Address | Register | Description |
|---|---|---|
| 0 | reserved | |
| 1 | reserved | |

TABLE 1-continued

| Address | Register | Description |
|---|---|---|
| 2 | reserved | |
| 3 | space_available | Read - returns available space in queue |
| 4 | select_queue | Write - sets queue to report space available |
| 5 | send_queue | Write - sends the messages in the specified queue |
| 6 | free_queue | Write - discards the messages in the specified queue |
| 7 | header | Write - sends the message Bits 0 to 7 - number of arguments used Bits 8 to 15 - TID Bits 16 to 23 - DID Bits 24 to 31 - queue to place message in (0 bypasses queues) |
| 8 | arg 0 | Message argument 0 |
| ... | | Message arguments 1-6 |
| 15 | arg 7 | Message argument 7 |

Processor 400 may achieve a sufficiently high throughput for sending messages for data-intensive, real time applications using message interface unit 450. In particular, argument registers 412 (i.e., the scratchpad memory) may be accessed by processor 400 to speculatively create messages that may later be sent. Processor 400 may be able to create and send messages at a high rate by making use of the scratchpad memory. Message interface unit 450 may control any access to the scratchpad memory and stall processor 400 if it attempts to write to an argument register that is currently being sent (e.g., as a part of a previous message). Otherwise, message interface unit 450 may allow processor 400 to write to an argument register during each clock cycle in preparation to send a message. The processor may send identical or similar messages efficiently because only the argument registers corresponding to argument values that change need to be written prior to a message being sent. Once processor 400 writes to header register 410, a message that includes the arguments in the scratchpad memory may either be sent or queued in one of queues 480. In this way, processor 400, together with message interface unit 450, may speculatively create and queue messages to be sent in the event that message interface unit 450 and/or processor 400 receive particular messages. Speculative message creation and queuing will be discussed in greater detail below.

Examples of software code that could be used by a processor, such as processor 400, to send a message or to discard any of the contents of a queue, are shown below. In the example code, the macros that are used are described within Appendix A, incorporated herein.

```
TX_SELECT_QUEUE (2);
do {
    words_available = TX_QUEUE_SPACE ( ); // optional
} while (words_available < 3);
TX_SEND_MSG1 (2, addr1, eid1, msg1_arg0);
TX_SEND_MSG2 (2, addr2, eid2, msg2_arg0, msg2_arg1);
// send message directly (no queue)
TX_SEND_MSG1 (1, addr1, eid1, msg1_arg0);
...some time later...
if (exception_occurs) {
    TX_FREE_QUEUE (2); // prediction was wrong,
    delete messages in queue
} else {
    TX_SEND_QUEUE (2); // prediction was correct,
    send messages in queue
}
```

Processor 400 may use argument registers 412 (i.e., the scratchpad memory), in message interface unit 450, to speculatively create messages. Processor 400 may write to header register 410 to send a message that the processor created (either to a device or to one of queues 480). Processor 400 may use a minimal number of clock cycles to send a message. In particular, the number of clock cycles to send a message may be equal to N writes (to write to the N argument registers 412 where N is the number of arguments)+1 write (to write to header register 410). In addition, a message may be sent without interrupting processor 400 (i.e., automatically sent by message interface unit 450 without involvement from processor 400). In some embodiments, argument registers 412 may retain their values so that a subsequent identical message can be sent with only one write to header register 410. Processor 400 may perform repeated writes to header register 410 to send the same message repeatedly.

When sending a message, arguments stored in argument registers 412 may be read and sent/forwarded sequentially to allow processor 400 to update (write to) the arguments registers 412 for arguments that have already been sent/forwarded. In order to create a new message rapidly, processor 400 may write to any one of argument registers 412 during the clock cycle immediately following the clock cycle during which the argument in that register had been sent/forwarded. Thus, at the start of the clock cycle following a write to header register 410, message interface unit 450 may allow processor 400 to write to the arg0 argument register (after previously stored argument arg0 has been sent/forwarded). During the subsequent clock cycle, message interface unit 450 may allow processor 400 to write to the arg1 argument register, in the following clock cycle, to the arg2 argument register, and so on.

The transmission databus, which is used to send/forward messages from transmit registers 460 to queues 480 or to other devices, may be a multiple of one argument's width. This may allow multiple arguments to be sent at once on the databus, and it may also allow messages to be created and sent/forwarded into the system or a queue without stalling processor 400. This may lead to improved efficiency for processor 400.

As discussed above, a message may be placed in one of queues 480 instead of being sent into the system or directly to a hardware unit. All the messages in any one of queues 480 may be discarded with a single write by processor 400 to free_queue register 408. All the messages in any one of queues 480 may be sent with a single write by processor 400 to send_queue register 406. In particular, processor 400 may speculatively create and queue a message into one of queues 480. Such speculative message creation and queuing may be performed by the processor in anticipation of expected events that may occur (e.g., an expectation that an incoming message with a new line of video to be upscaled will arrive in the future). Messages may be created (as described above) and queued speculatively during clock cycles during which the processor is idle (e.g., messages, to be sent by the processor in response to receiving a new line of video, may be speculatively created using transmit registers 460 and queued using queues 480). This type of speculative message creation and queuing may allow message interface unit 450 to achieve a high message throughput because several messages may be speculatively queued and sent rapidly in response to an expected message arriving. In addition, this type of speculative message creation and queuing may allow message interface unit 450 to achieve a low message response latency by avoiding the use of additional cycles to create messages in response to an expected message arriving. To reduce latency further, message interface unit 450 may be configured to automatically send or discard any or all of the messages in one of queues 480 when triggered by a particular message (also referred to as a triggering message) thereby freeing additional clock cycles from processor 400 to potentially perform other tasks.

As described above, one or more queues 480 may be used to queue message speculatively. Message interface unit 450, acting on behalf of processor 400, or independently, may take action in response to a particular message being received by message interface unit 450 or processor 400. The action taken by message interface unit 450 allows for it to send or discard any message in one of the queues or all of the messages contained within one or more of queues 480 in response to a particular message being received by message interface unit 450 or processor 400. For example, processor 400 and/or message interface unit 450 may discard all of the messages in one of queues 480 when it receives a message indicating that an exception occurred. Message interface unit 450 may include configurable triggers (not shown) that allow any or all of the messages contained within any of queues 480 to be sent or discarded automatically on receipt of a message (i.e., a triggering message). These triggers may effectively allow message interface unit 450 to act on the receipt of a message (a triggering message) without the involvement of processor 400, thereby reducing the burden on processor 400. In some embodiments the configurable triggers may be hardwired or programmed in hardware units within message interface unit 450. In some embodiments, the configurable triggers may be based in software operating on message interface unit 450.

Message interface unit 450 may include receive registers 470, which include several reserved registers (not shown), select_queue register 420, fill_level register 422, get_message register 424, header register 426, and argument registers 428. Processor 400 may read from or write to transmit registers 470 via message interface unit 450. In one embodiment, the addresses of receive registers 470 and the description with regards to what occurs when processor 400 either writes to or reads from each of these registers is shown in Table 2.

TABLE 2

| Address | Register | Description |
|---------|----------|-------------|
| 0 | reserved | |
| 1 | reserved | |
| 2 | reserved | |
| 3 | fill_level | Read - returns the fill level of the queue |
| 4 | select_queue | Write - sets queue to report fill level |
| 5 | get_message | Write - causes the MIU to get the next message (when available) from the specified queue |
| 6 | reserved | |
| 7 | header | Bits 0 to 7 - number of arguments used<br>Bits 8 to 15 - EID<br>Bits 16 to 23 - source address<br>Bit 24 -message valid (set to 0 if no new messages available yet)<br>Bits 25 to 31 - reserved |
| 8 | arg 0 | Message argument 0 |
| ... | | Message arguments 1-6 |
| 15 | arg 7 | Message argument 7 |

Examples of software code that could be used by a processor, such as processor 400, to receive a message is shown below. In the example code, the macros that are used are described within Appendix B, incorporated herein.

```
RX_SELECT_QUEUE (2);
if (RX_QUEUE_FILL_LEVEL ( ) == 0) { // optional
    // make prediction about what the next message
    will be
} else {
    RX_RECV_MSG (2);
    do {
        header = RX_HEADER
    } while(header & 0x1000000);
    eid = (header & 0xFF00) >> 8;
    switch(eid) {
        case TASK_1:
            int result = RX_ARG0 + RX_ARG1;
            ...
            break;
        case TASK_2: ... break;
    }
}
```

Messages may be loaded into argument registers 428, from one or more of queues 490, when processor 400 performs a write operation to get_message register 424. Processor 400 may use a minimal number of clock cycles to load/receive a message. In particular, the number of clock cycles to load/receive a message may be equal to 1 write (to write to get_message register 424)+1 read (to read from header register 426)+N reads (to read from the N argument registers 428, where N is the number of arguments). In addition, in some embodiments, a message may be loaded/received without interrupting processor 400 (i.e., automatically loaded/received by message interface unit 450).

When loading/receiving a message, argument registers 428 may be written to and read from sequentially to allow processor 400 to read arguments from the arguments registers 428 that have already been written (e.g., via one of queues 490) and have recently become available. In order to load a new message rapidly, processor 400 may read from any one of argument registers 428 during the clock cycle immediately following the clock cycle during which the argument in that register had been written to via, for example, one of queues 490. Thus, at the start of the clock cycle following a write to get_message register 424, message interface unit 450 may allow processor 400 to read the arg0 argument register (one clock cycle after argument arg0 has been written to via, for example, one of queues 490). During the subsequent clock cycle, message interface unit 450 may allow processor 400 to read from the arg1 argument register, in the following clock cycle, from the arg2 argument register, and so on.

The receive databus, which is used to load/receive messages from queues 490 to receive registers 470, may be a multiple of one argument's width. This may allow multiple arguments to be loaded/received at once on the databus and it may also allow messages to be loaded/received and read without stalling processor 400. This may lead to improved efficiency for processor 400.

Messages sent to processor 400 or message interface unit 450 may be placed in one of queues 490. Each of one or more queues 490 may have a different unique destination address to allow each of the hardware units to be able to send its message to the appropriate queue. Because processor 400 may be able to receive messages from any one of queues 490, this use of dedicated queuing allows particular messages to "jump ahead" and be processed earlier than other messages. Moreover, such use of dedicated queuing allows the system to queue messages according to different priorities. This may be accomplished by assigning a different priority level to each of queues 490. In such a scheme, the address assigned to each queue may be indicative of and/or associated with the particular priority level.

Figure 5:
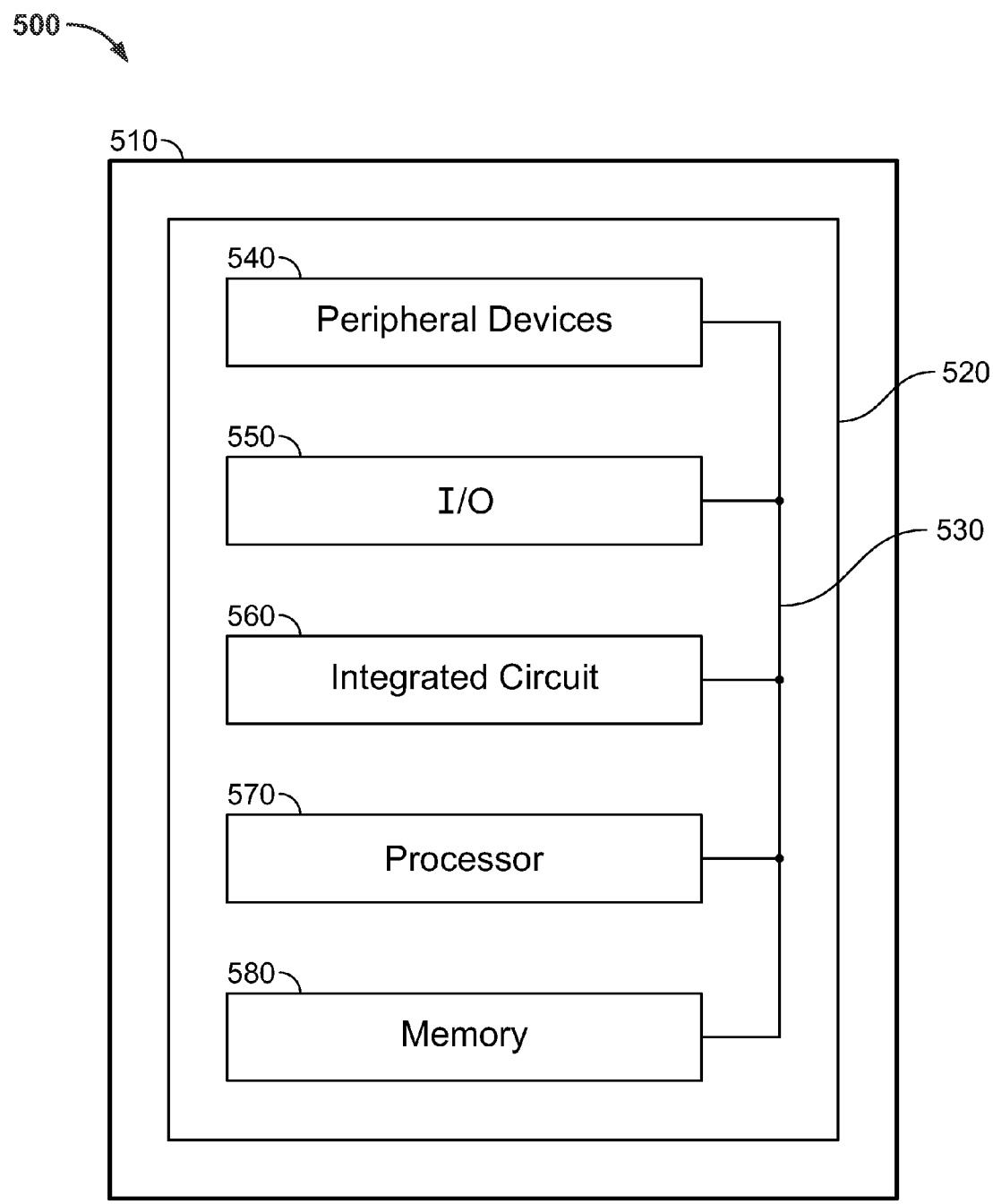
FIG. 5 illustrates an integrated circuit (IC) or other device (e.g., PLD, ASSP, ASIC, full-custom chip, dedicated chip, programmable logic device, or FPGA) which includes embodiments of the message interface unit described herein as being within a data processing system.

FIG. 5 illustrates data processing system 500, which makes use of Integrated Circuit (IC) 560 or another device (e.g., ASSP, ASIC, full-custom chip, dedicated chip, programmable logic device, or FPGA). System 500 includes embodiments of the message interface unit described herein. In an embodiment, IC 560 may be substantially similar to system 200 of FIGS. 2A and 2B. Data processing system 500 can include one or more of the following components: a processor 570, memory 580, I/O circuitry 550, and peripheral devices 540. These components are coupled together by a system bus or other interconnections 530 and are populated on a circuit board 520, which is contained in an end-user system 510.

System 500 could be used in a wide variety of applications, such as computer networking, data networking, instrumentation, video processing, digital signal processing, or any other application where the advantage of using programmable or reprogrammable logic is desirable. IC 560 can be used to perform a variety of different logic functions. For example, IC 560 can be configured as a processor or controller that works in cooperation with processor 570. IC 560 may also be used as an arbiter for arbitrating access to a shared resource in system 500. In yet another example, IC 560 can be configured as an interface between processor 570 and one of the other components in system 500 or another device or hardware unit outside of system 500. It should be noted that system 500 is only exemplary, and that the true scope and spirit of the invention should be indicated by the following claims.

It will be understood that the foregoing are only illustrative of the principles of the invention, and that various modifications can be made by those skilled in the art without departing from the scope and spirit of the invention. For example, message interface unit 220 of FIG. 2B may be similar to message interface unit 450 of FIG. 4. In addition, message interface unit 220 may be used interchangeably with message interface unit 450. One skilled in the art will appreciate that the present invention can be practiced by other than the described embodiments, which are presented for purposes of illustration and not of limitation, and the present invention is limited only by the claims that follow.

APPENDIX A

Transmit API

TX_SELECT_QUEUE(queue_id)
   Selects the queue that the TX_QUEUE_SPACE command returns the space available of
   If only one queue is used this only needs to be done once at start up
   Single write to the MIU
words_available=TX_QUEUE_SPACE( );
   Gets the space available in the queue selected by TX_SELECT_QUEUE (in words)
   Single read from MIU
TX_ARG(n, value);
   Sets the $n^{th}$ argument of the current message
   Single write to MIU
TX_SEND_MSG(queue_id, dst_addr, eid, no_of_arguments);
   Sets the eid and dst_addr fields of the current message
   Causes the MIU to write the current message to the specified queue
   Single write to MIU
   Queue 0 can be configured as a direct send This sends the message out into the system straight away, without the need to send a TX_SEND_QUEUE message later TX_SEND_MSG1(queue_id, dst_addr, eid, arg0)
 Concise way of sending a single argument message
 2 writes to the MIU, 1 for arg0 and 1 for header
 TX_SEND_MSG2 to TX_SEND_MSG8 can be used to send multiple argument messages
 3 to 9 writes to the MIU respectively TX_SEND_QUEUE(queue_id);
 Sends all of the messages in the queue out into the system, in the order that they are in the queue
 Single write to MIU TX_QUEUE_FREE(queue_id);
 Deletes all of the messages in the queue
 Single write to MIU

APPENDIX B

Receive API

RX_SELECT_QUEUE(queue_id)
 Selects the queue that the RX_QUEUE_FILL_LEVEL command returns the fill level of
 If only one queue is used this only needs to be done once at start up
 Single write to the MIU no_of_messages=RX_QUEUE_FILL_LEVEL( );
 Gets the number of messages in the queue selected by RX_SELECT_QUEUE
 Single read to the MIU header=RX_HEADER
 Gets the message header of the current message
 Check bit 24 to see if the message is valid (0 indicates no messages available yet)

arg0=RX_ARG0;
 Gets the 1$^{st}$ argument of the current message
 Single read from the MIU
 RX_ARG(0 to N) can be used to get the 1$^{st}$ to N+1th arguments RX_RECV_MSG(queue_id);
 Causes the MIU to update the current message with the next message from the queue
 Single read to MIU

What is claimed is:

1. A message network interface unit, coupled to a processor, for allowing the processor to send a plurality of messages, created by the processor, to a hardware unit, the message network interface unit comprising:
 transmit registers, each operable to store a respective argument of a plurality of arguments of at least one message of the plurality of messages created by the processor, wherein the at least one message is speculatively created from a previous speculatively created message by updating only a subset of the plurality of arguments that has changed from the previous speculatively created message; and
 a queue, coupled to the transmit registers, operable to queue the plurality of messages, wherein an action is taken on the queue in response to the message network interface unit receiving a triggering message, wherein the speculatively created at least one message is created in anticipation of an expected event.

2. The message network interface unit of claim 1, wherein the action is discarding content of the queue, and wherein the triggering message indicates that an exception occurred.

3. The message network interface unit of claim 1, wherein the action is sending the plurality of messages in the queue.

4. The message network interface unit of claim 1, wherein the transmit registers are used to create each message of the plurality of messages prior to determination of whether any message of the plurality of messages will be sent.

5. The message network interface unit of claim 1, wherein the transmit registers comprise a scratchpad memory to store arguments of the at least one message.

6. The message network interface unit of claim 1, wherein the message network interface unit and the processor are located on a same device.

7. The message network interface unit of claim 6, wherein the device is a programmable logic device.

8. A video scalar, which scales video from one format to another using the message network interface unit of claim 1.

9. A method for allowing a processor coupled to a message network interface unit to send a plurality of messages to a hardware unit, the method comprising:
 speculatively creating at least one message of the plurality of messages from a previous speculatively created message using the processor, wherein the creating comprises updating only a subset of a plurality of arguments of the at least one message and storing each argument of the plurality of arguments of the at least one message of the plurality of messages in a respective transmit register, and wherein the subset of the plurality of arguments has changed from the previous speculatively created message;
 queuing the plurality of messages in a queue coupled to the transmit registers;
 receiving, at the message network interface unit, a message indicating an action is to be taken; and
 acting on the queue in response to receiving the message indicating the action is to be taken, wherein the speculatively created plurality of messages are created in anticipation of an expected event.

10. The method of claim 9, wherein the acting comprises discarding content of the queue, and wherein the message indicating the action is to be taken indicates that an exception has occurred.

11. The method of claim 9, wherein the acting comprises sending the plurality of messages in the queue.

12. The method of claim 9, wherein the speculatively creating uses the transmit registers, prior to determination of whether a message of the plurality of messages will be sent.

13. The method of claim 9, wherein storing the arguments of the at least one message of the plurality of messages comprises storing the arguments of the at least one message of the plurality of messages in a scratchpad memory.

14. The method of claim 9, wherein the message network interface unit and the processor are located on a same device.

15. The method of claim 14, wherein the device is a programmable logic device.

16. A message network interface unit, coupled to a processor, for allowing the processor to receive a plurality of messages from a hardware unit, the message network interface unit comprising:
 a plurality of queues operable to queue the plurality of messages, wherein at least one queue of the plurality of queues is assigned an address indicating an associated priority level; and
 receive registers, coupled to the plurality queues, each operable to store a respective argument of a plurality of arguments of at least one message of the plurality of messages, wherein the at least one message is speculatively created from a previous speculatively created message by updating only a subset of the plurality of arguments that has changed from the previous speculatively created message.

17. The message network interface unit of claim 16, wherein the receive registers are operable to store the arguments of the at least one message of the plurality of messages from a queue of the plurality of queues associated with the address indicating a current highest priority level.

18. The message network interface unit of claim 17, wherein the processor processes a message in the queue of the plurality of queues associated with the address indicating the current highest priority level, prior to processing other messages in another queue of the plurality of queues.

19. The message network interface unit of claim 16, wherein the address is unique, and wherein the address is used as a destination address for the plurality of messages received from the hardware unit.

20. The message network interface unit of claim 16, wherein the message network interface unit and the processor are located on a programmable logic device.

* * * * *